(12) United States Patent
Cho et al.

(10) Patent No.: US 9,154,774 B2
(45) Date of Patent: Oct. 6, 2015

(54) STEREOSCOPIC IMAGING SYSTEM FOR FORMING THREE-DIMENSIONAL STEREOSCOPIC IMAGES

(75) Inventors: Jin Hyun Cho, Seoul (KR); Yong Dok Cha, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 655 days.

(21) Appl. No.: 13/210,828

(22) Filed: Aug. 16, 2011

(65) Prior Publication Data

US 2012/0050628 A1 Mar. 1, 2012

(30) Foreign Application Priority Data

Aug. 26, 2010 (KR) .................. 10-2010-0082937

(51) Int. Cl.
*G02F 1/1335* (2006.01)
*G02B 25/00* (2006.01)
*H04N 13/04* (2006.01)

(52) U.S. Cl.
CPC ...... *H04N 13/0438* (2013.01); *H04N 2213/008* (2013.01)

(58) Field of Classification Search
CPC ..... G02B 27/22; G02B 27/26; G02B 27/2228
USPC .......... 349/13, 15; 356/12; 359/643, 464, 466
See application file for complete search history.

(56) References Cited

U.S. PATENT DOCUMENTS 4,884,876 A 12/1989 Lipton et al.
6,042,236 A * 3/2000 Hatakeyama et al. .......... 353/31
6,094,242 A * 7/2000 Yamanaka ...................... 349/13
6,348,957 B1 * 2/2002 Yamazaki et al. .............. 349/15
7,821,583 B2 * 10/2010 Yeh et al. ....................... 349/15
8,228,449 B2 * 7/2012 Lee et al. ........................ 349/15
2002/0044350 A1 4/2002 Sato et al.

(Continued)

FOREIGN PATENT DOCUMENTS

EP 0349692 A2 1/1990
EP 2085808 A1 8/2009

OTHER PUBLICATIONS

Communication, dated Apr. 19, 2013, issued by the European Patent Office in counterpart European Application No. 11178622.4.
Extended European Search Report, dated Jan. 16, 2014, issued by the European Patent Office in counterpart European Application No. 11 178 622.4.

(Continued)

*Primary Examiner* — Hoan C Nguyen
(74) *Attorney, Agent, or Firm* — Sughrue Mion, PLLC

(57) ABSTRACT

A stereoscopic imaging system to prevent deterioration in brightness and optical characteristics due to deviation of an optical axis upon formation of a stereoscopic image is provided. The stereoscopic imaging system includes a stereoscopic image display device to output linearly polarized light, a phase difference plate provided at a front surface of the stereoscopic image display device and which converts the linearly polarized light output from the stereoscopic image display device into circularly polarized light, and liquid crystal shutter glasses having a phase difference plate attached to a front surface thereof and which restores the circularly polarized light having passed through the phase difference plate into the linearly polarized light. Upon formation of a stereoscopic image, the liquid crystal shutter glasses may restore light output from the stereoscopic image display device without loss.

24 Claims, 6 Drawing Sheets

(56) References Cited

U.S. PATENT DOCUMENTS

2010/0328439 A1* 12/2010 Mihara et al. .................... 348/53
2012/0206665 A1* 8/2012 Sakai et al. ...................... 349/13

OTHER PUBLICATIONS

"Polarizer," Wikipedia, Retrieved from the internet: URL: http://en.wikipedia.org/wiki/Circular_polarizer#Circular_polarizers; retrieved on Jan. 9, 2014; pp. 1-13.

* cited by examiner

STEREOSCOPIC IMAGING SYSTEM FOR FORMING THREE-DIMENSIONAL STEREOSCOPIC IMAGES

CROSS-REFERENCE TO RELATED APPLICATION

This application claims priority from Korean Patent Application No. 2010-0082937, filed on Aug. 26, 2010 in the Korean Intellectual Property Office, the disclosure of which is incorporated herein by reference.

BACKGROUND

1. Field

Methods and apparatuses consistent with the exemplary embodiments relate to a stereoscopic imaging system to form a three-dimensional stereoscopic image.

2. Description of the Related Art

Generally, stereoscopic imaging systems are designed to display an image via digital sampling and a series of signal processing operations of image signals transmitted from a video card. Image signal scanning methods of the stereoscopic imaging systems are broadly classified into progressive scanning methods, non-interlaced scanning methods, and interlaced scanning methods. The progressive scanning methods provide one image frame made up of one field image, whereas the interlaced scanning methods provide one image frame made up of two field images.

Three-dimensional stereoscopic imaging technologies generally realize a three-dimensional effect using binocular parallax. Binocular parallax is the primary way in which depth perception is achieved. Methods of viewing stereoscopic images are broadly divided into methods employing glasses and methods that do not employ glasses. Examples of the methods employing glasses include an anaglyph method in which a blue lens is placed over one eye and a red lens is placed over the other eye, a polarized glasses method using polarized lenses having different polarizing directions, and a liquid-crystal shutter glasses method in which a liquid crystal shutter is synchronized with a repetition period of time-sharing screens.

Representative examples of the methods not employing glasses include a lenticular method in which a lenticular lens plate in the form of an array of vertically arranged cylindrical lenses is installed in front of an imaging panel, and a parallax barrier method.

SUMMARY

Therefore, it is one aspect of the exemplary embodiments to provide a stereoscopic imaging system, which may prevent deterioration in brightness and optical characteristics when a polarizing axis of a stereoscopic image display device deviates from a polarizing axis of liquid crystal shutter glasses upon formation of a stereoscopic image.

Additional aspects of the exemplary embodiments will be set forth in part in the description which follows and, in part, will be obvious from the description, or may be learned by practice of the exemplary embodiments.

In accordance with one aspect of the exemplary embodiments, a stereoscopic imaging system of a liquid crystal shutter glasses type includes a stereoscopic image display device to output linearly polarized light, a phase difference plate provided at a front surface of the stereoscopic image display device and which converts the linearly polarized light output from the stereoscopic image display device into circularly polarized light, and liquid crystal shutter glasses having a phase difference plate attached to a front surface thereof and which restores the circularly polarized light having passed through the phase difference plate into the linearly polarized light.

The stereoscopic image display device may contain a polarizing plate to output the linearly polarized light, and a polarizing axis of the polarizing plate contained in the stereoscopic image display device may have an angle of 45 degrees with respect to a phase delay axis of the phase difference plate located at the front surface of the stereoscopic image display device.

The phase difference plate located at the front surface of the stereoscopic image display device and the phase difference plate attached to the front surface of the liquid crystal shutter glasses may be arranged to have a quarter phase delay.

A phase delay axis of the phase difference plate located at the front surface of the stereoscopic image display device may have an angle of 90 degrees with respect to a phase delay axis of the phase difference plate attached to the front surface of the liquid crystal shutter glasses.

The liquid crystal shutter glasses may include a liquid crystal member and polarizing plates attached respectively to front and rear surfaces of the liquid crystal member, and polarizing axes of the polarizing plates attached to the front and rear surfaces may be orthogonal to each other.

In accordance with another aspect of the exemplary embodiments, a stereoscopic imaging system of a liquid crystal shutter glasses type includes a stereoscopic image display device to output light, a polarizing plate provided at a front surface of the stereoscopic image display device and which converts the light into linearly polarized light, a phase difference plate provided at a front surface of the polarizing plate and which converts the linearly polarized light output into circularly polarized light, and liquid crystal shutter glasses having a phase difference plate attached to a front surface thereof and which restores the circularly polarized light having passed through the phase difference plate into the linearly polarized light.

A polarizing axis of the polarizing plate provided at the front surface of the stereoscopic image display device may have an angle of 45 degrees with respect to a phase delay axis of the phase difference plate located at the front surface of the polarizing plate.

The phase difference plate located at the front surface of the stereoscopic image display device and the phase difference plate attached to the front surface of the liquid crystal shutter glasses may be arranged to have a quarter phase delay.

A phase delay axis of the phase difference plate located at the front surface of the polarizing plate may have an angle of 90 degrees with respect to a phase delay axis of the phase difference plate located at the front surface of the liquid crystal shutter glasses.

The liquid crystal shutter glasses may include a liquid crystal member and polarizing plates attached respectively to front and rear surfaces of the liquid crystal member, and polarizing axes of the polarizing plates attached to the front and rear surfaces may be orthogonal to each other.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1A:
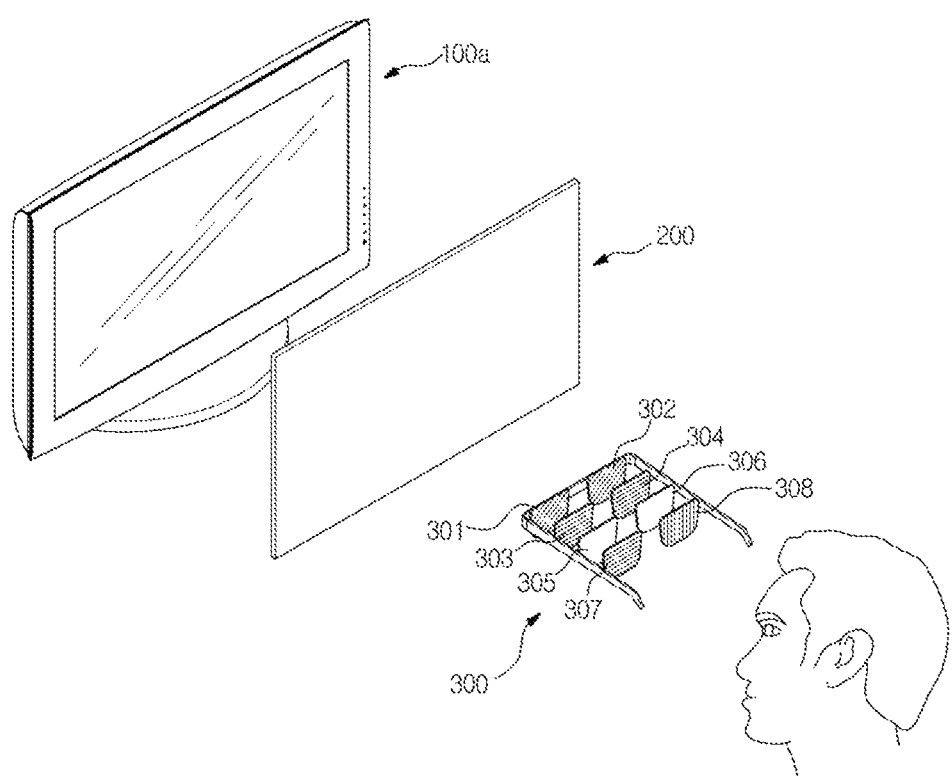
FIGS. 1A and 1B are schematic views illustrating different stereoscopic imaging systems using liquid crystal shutter glasses according to exemplary embodiments.

Reference will now be made in detail to the exemplary embodiments, examples of which are illustrated in the accompanying drawings, wherein like reference numerals refer to like elements throughout.

Figure 1B:
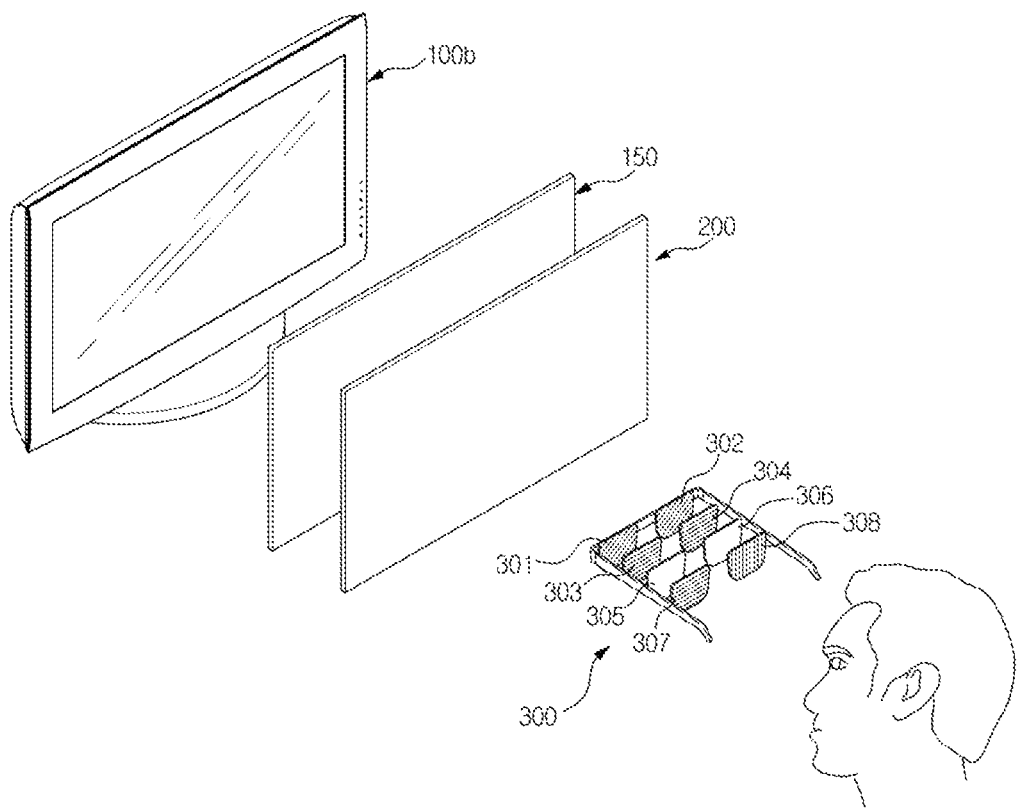

FIGS. 1A and 1B are schematic views illustrating different stereoscopic imaging systems using liquid crystal shutter glasses according to exemplary embodiments.

Referring to FIG. 1A, the stereoscopic imaging system using liquid crystal shutter glasses may include a stereoscopic image display device 100a, a phase difference plate 200 provided at a front surface of the stereoscopic image display device 100a, and liquid crystal shutter glasses 300 to receive light passing through the phase difference plate 200 to allow a viewer to perceive a stereoscopic image.

The stereoscopic image display device 100a may be a display (for example, a Liquid Crystal Display (LCD)) that outputs linearly polarized light. To output the linearly polarized light, the stereoscopic image display device 100a may contain a polarizing plate therein.

The phase difference plate 200 is provided at the front surface of the stereoscopic image display device 100a. The linearly polarized light output from the stereoscopic image display device 100a is converted into elliptically polarized light while passing through the phase difference plate 200. In the exemplary embodiment, a polarizing axis of the polarizing plate contained in the stereoscopic image display device 100a has an angle of 45 degrees with respect to a phase delay axis of the phase difference plate 200 provided at the front surface of the stereoscopic image display device 100a and the phase difference plate 200 has a quarter phase delay, so as to modulate the linearly polarized light into completely circularly polarized light.

When providing the phase difference plate 200 at the front surface of the stereoscopic image display device 100a to convert the linearly polarized light into the circularly polarized light, it may be possible to prevent deterioration in optical characteristics due to deviation between a polarizing axis of the stereoscopic image display device 100a and a polarizing axis of the liquid crystal shutter glasses 300.

A left eye shutter of the liquid crystal shutter glasses 300 includes a phase difference plate 301, a liquid crystal member 305 and two polarizing plates 303 and 307 to enable viewing of a left eye image alone, and a right eye shutter of the liquid crystal shutter glasses 300 includes a phase difference plate 302, a liquid crystal member 306 and two polarizing plates 304 and 308 to enable viewing of a right eye image alone.

The circularly polarized light output from the phase difference plate 200 is converted into linearly polarized light while passing through the phase difference plates 301 and 302 of the liquid crystal shutter glasses 300 (i.e. the circularly polarized light is restored to the previous linearly polarized light). In the exemplary embodiment, to assure perfect restoration from the circularly polarized light into the linearly polarized light, the phase delay axis of the phase difference plate 200 provided at the front surface of the stereoscopic image display device 100a is oriented orthogonally to phase delay axes of the phase difference plates 301 and 302 of the liquid crystal shutter glasses 300.

The restored linearly polarized light having passed through the phase difference plates 301 and 302 of the liquid crystal shutter glasses 300 reaches the liquid crystal members 305 and 306 after passing through the polarizing plates 303 and 304 located at a front surface of the liquid crystal shutter glasses 300. The liquid crystal members 305 and 306 perform orthogonal or parallel light transmission according to synchronization signals. In a state in which no drive voltage is applied to the liquid crystal members 305 and 306, liquid crystal molecules of the liquid crystal members 305 and 306 have a twist angle of about 90 degrees to twist and transmit incident light by about 90 degrees (orthogonal light transmission). Then, if drive voltage is applied to the liquid crystal members 305 and 306, the liquid crystal molecules are arranged in parallel in an electric field direction by dielectric effects so as to transmit light in parallel (parallel light transmission).

The light, which has undergone orthogonal or parallel transmission through the liquid crystal members 305 and 306 of the liquid crystal shutter glasses 300, reaches the polarizing plates 307 and 308 located at a rear surface of the liquid crystal shutter glasses 300. The polarizing plates 307 and 308 located at the rear surface of the liquid crystal shutter glasses 300 are arranged such that a polarizing axis of the polarizing plate 307 corresponding to the left eye and a polarizing axis of the polarizing plate 308 corresponding to the right eye are orthogonal to each other. Thus, the light, which has undergone orthogonal or parallel transmission through the liquid crystal members 305 and 306, has an optical axis orthogonal to any one of the polarizing axes of the polarizing plates 307 and 308 and is not allowed to pass through the corresponding polarizing plate 307 or 308, but has an optical axis parallel to the other polarizing axis to pass through the other polarizing plate 308 or 307. In this way, the liquid crystal shutter glasses 300 open the left eye shutter when a left eye image of the stereoscopic image display device 100a is displayed on a screen (i.e. the liquid crystal member 305 is controlled to transmit the light to the left eye), and open the right eye shutter when a right eye image of the stereoscopic image display device 100a is displayed on a screen (i.e. the liquid crystal member 306 is controlled to transmit the light to the right eye), the opening of the left eye shutter and the right eye shutter being alternately repeated very rapidly. It is substantially impossible for a viewer to perceive a time difference between the alternate opening of the left eye shutter and the right eye shutter. Consequently, as the left and right eye images are rapidly alternated, the viewer perceives the left and right eye images almost simultaneously, thus perceiving a single stereoscopic image. Here, the two left or right polarizing plates 303 and 307 or 304 and 308 and the liquid crystal members 305 and 306 of the liquid crystal shutter glasses 300 function as liquid crystal shutters.

FIG. 1B is a view illustrating an exemplary embodiment of a stereoscopic image display device 100b that, different from the exemplary embodiment of FIG. 1A, does not output linearly polarized light.

If output light of the stereoscopic image display device 100b is not linearly polarized, a polarizing plate 150 may be provided between the stereoscopic image display device 100b and the phase difference plate 200 provided at the front surface of the device 100b, to convert the light into linearly polarized light so as to perform the same operation and obtain the same effects as the exemplary embodiment illustrated in FIG. 1A. The exemplary embodiment illustrated in FIG. 1B is identical to that of FIG. 1A except for the fact that the polarizing plate 150 is provided between the stereoscopic image display device 100b and the phase difference plate 200 and thus, a description thereof will be omitted.

Figure 2:
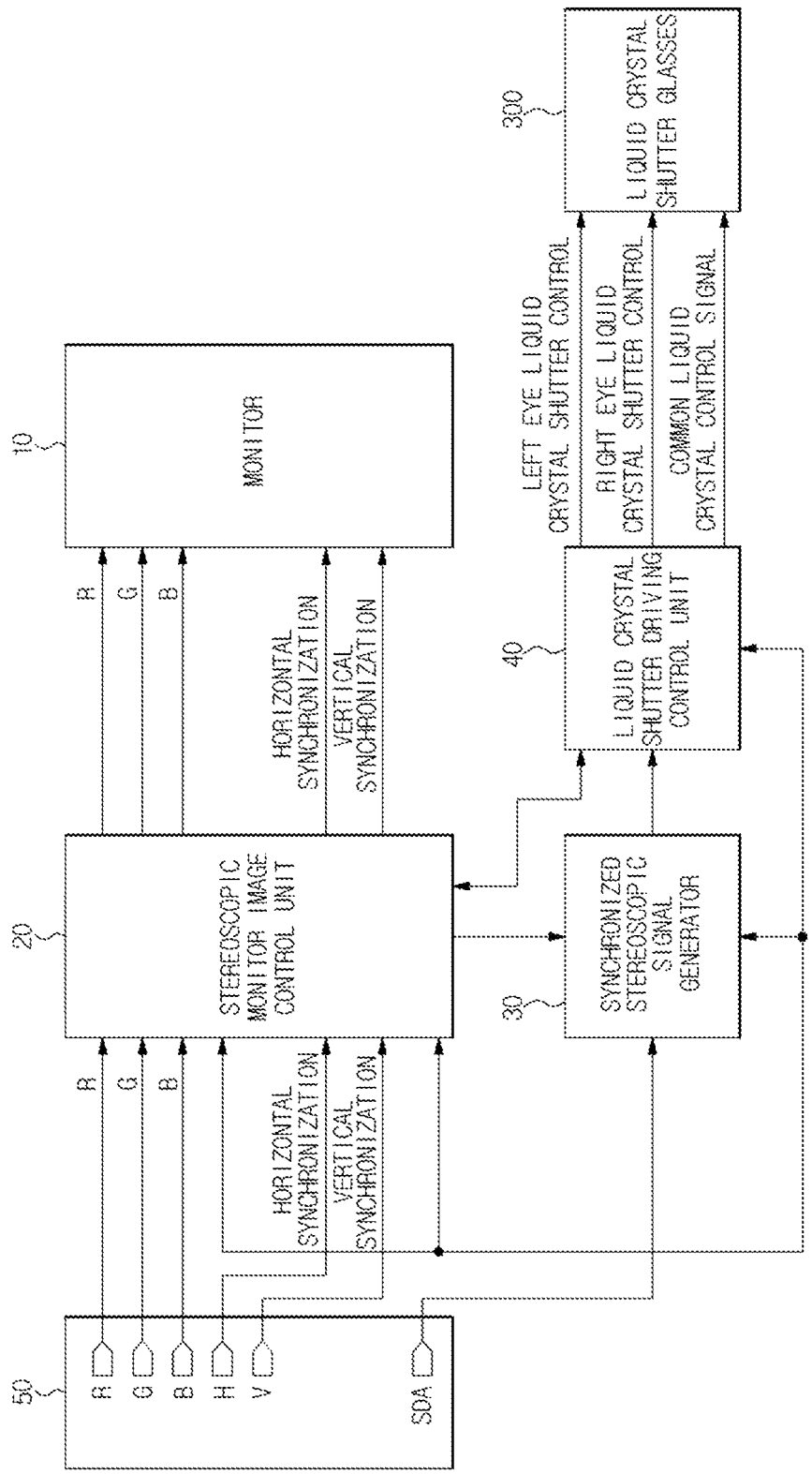
FIG. 2 is a control block diagram of the stereoscopic imaging system according to an exemplary embodiment.

FIG. 2 is a control block diagram of the stereoscopic imaging system according to the exemplary embodiment.

The stereoscopic imaging system may include a monitor 10 to display an image, a stereoscopic monitor image control unit 20, a synchronization stereoscopic signal generator 30, the liquid crystal shutter glasses 300 for the monitor 10, and a liquid crystal shutter driving control unit 40. The stereoscopic monitor image control unit 20 functions to divide a stereoscopic image, which is composed in the unit of a frame or field, into a left eye image and a right eye image. The synchronization stereoscopic signal generator 30 functions to generate synchronization stereoscopic signals by processing image signals R, G and B and synchronization signals V and H from the stereoscopic monitor image control unit 20 and signals from Serial Data Adaptor (SDA) terminals. The liquid crystal shutter glasses 300 are used to watch the image displayed on the monitor 10. The liquid crystal shutter driving control unit 40 is connected to both the synchronization stereoscopic signal generator 30 and the liquid crystal shutter glasses 300, and controls the left and right liquid crystal shutters of the liquid crystal shutter glasses 300 such that each of the liquid crystal shutters is opened or closed for a predetermined time in response to the synchronization stereoscopic signals of the left and right eye images displayed on the monitor 10. Hereinafter, operation of the stereoscopic imaging system will be described.

When the R, G and B image signal of an image, reproduced by, e.g., a computer or a digital broadcast receiver, and horizontal/vertical synchronization signals H and V are input via an interface 50, the synchronization stereoscopic signal generator 30 selects and outputs one of stereoscopic signals included in the signals of the SAD terminals or frequency divided signals of the vertical synchronization signals V. Also, the liquid crystal shutter driving control unit 40 outputs signals to control the input time of the image signals R, G and B to the monitor 10 and the opening/closing time of the liquid crystal shutter glasses 300 on the basis of the output signals of the synchronization stereoscopic signal generator 30.

The stereoscopic monitor image control unit 20 performs frequency division of the horizontal and vertical synchronization signals H and V from each other and thereafter, on the basis of the frequency divided signals, transmits the image signals R, G and B to the monitor 10 in response to control signals of the liquid crystal shutter driving control unit 40, so as to alternately display left and right eye images.

The left eye liquid crystal shutter and the right eye liquid crystal shutter of the liquid crystal shutter glasses 300 are alternately opened or closed under control of the liquid crystal shutter driving control unit 40, allowing the left and right eye images displayed on the monitor 10 to be reproduced as a stereoscopic image.

Figure 3:
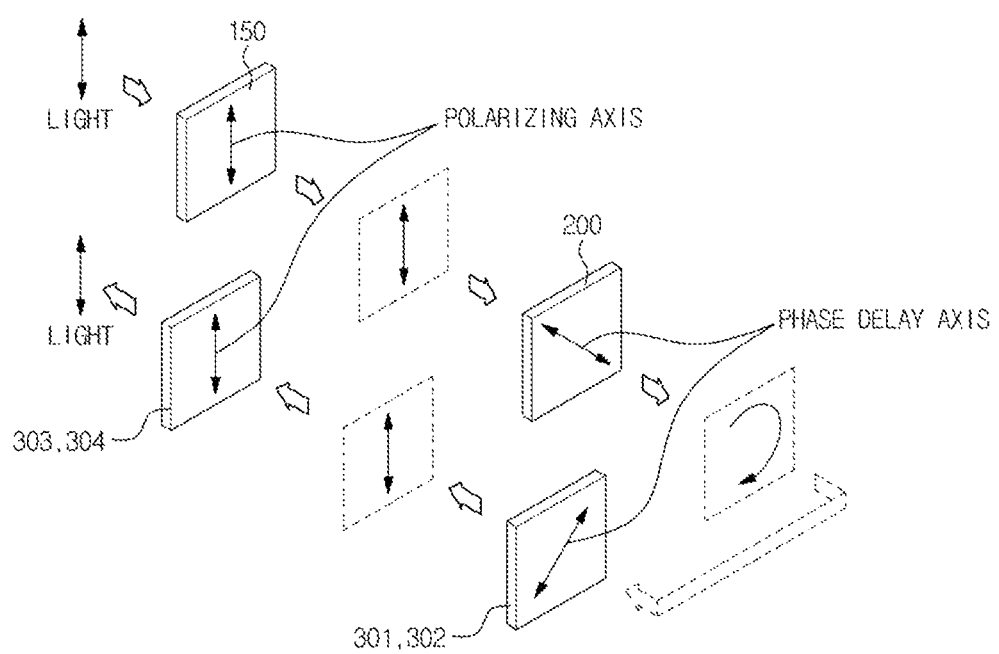
FIG. 3 is a view illustrating projection of light from a stereoscopic image display device to the liquid crystal shutter glasses without loss in the stereoscopic imaging system according to an exemplary embodiment.

FIG. 3 is a view illustrating projection of light from the stereoscopic image display device to the liquid crystal shutter glasses without loss in the stereoscopic imaging system according to the exemplary embodiment. FIG. 3 will be described based on the exemplary embodiment of FIG. 1B of the two exemplary embodiments above described.

Light output from the stereoscopic image display device 100b is linearly polarized in a polarizing axis direction while passing through the polarizing plate 150. The linearly polarized light is converted into circularly polarized light while passing through the phase difference plate 200. The phase difference plate 200 undergoes a quarter phase delay, and a linear polarizing axis (an optical axis of the polarizing plate) has an angle of 45 degrees with respect to a phase delay axis (an optical axis of the phase difference plate). Here, the stereoscopic image display device 100b is an example of a display that does not output linearly polarized light. Thus, in the case of a display to output linearly polarized light from the monitor 10, such as an LCD, the polarizing plate 150 of the above described configuration will be omitted such that the linearly polarized light output from the display directly passes through the phase difference plate 200 to thereby be converted into circularly polarized light.

The circularly polarized light, obtained by the polarizing plate 150 attached to the stereoscopic image display device 100b and the phase difference plate 200, passes through the phase difference plates 301 and 302 of the liquid crystal shutter glasses 300. The circularly polarized light is reconverted into linearly polarized light while passing through the phase difference plates 301 and 302. That is, the circularly polarized light is restored into the previous linearly polarized light obtained by the polarizing plate 150 attached to the stereoscopic image display device 100b.

Then, the light reaches the polarizing plates 303 and 304 of the liquid crystal shutter glasses 300. The polarizing plates 303 and 304 converts the light into linearly polarized light along the polarizing axes thereof. The linearly polarized light having passed through the polarizing plates 303 and 304 is identical to the light output from the stereoscopic image display device 100b (no light loss).

Hereinafter, opening/closing operations of the left and right eye liquid crystal shutters with respect to the light having passed through the polarizing plates 303 and 304 located at the front surface of the glasses 300 will be described.

Figure 4A:
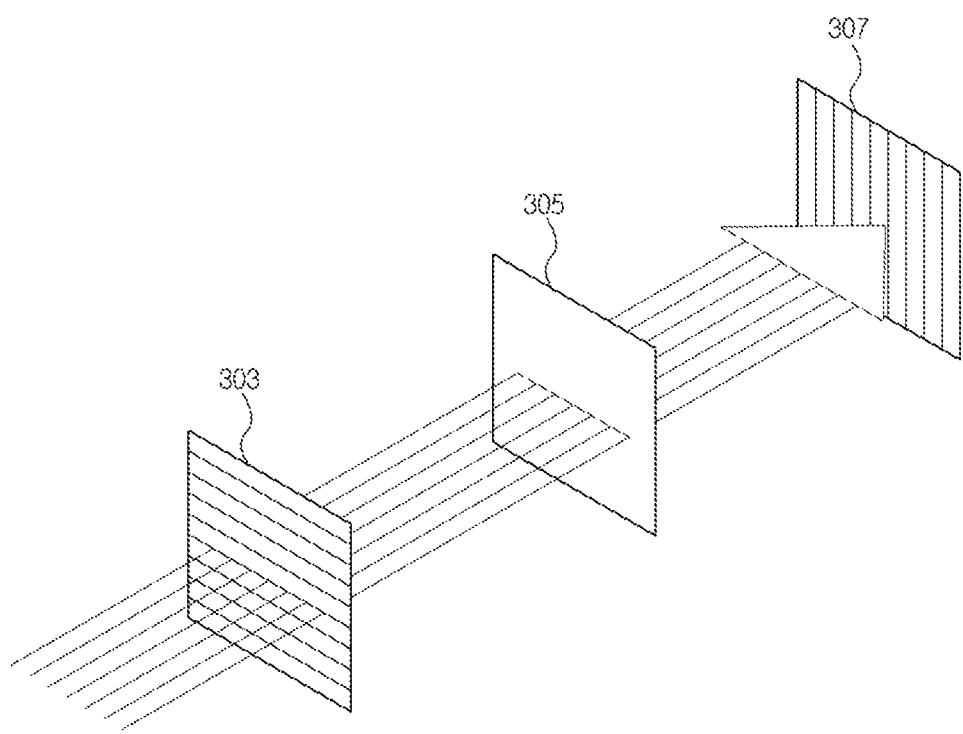
FIGS. 4A and 4B are views illustrating a shutter opening/closing action of the liquid crystal shutter glasses of the stereoscopic imaging system according to an exemplary embodiment.
Figure 4B:
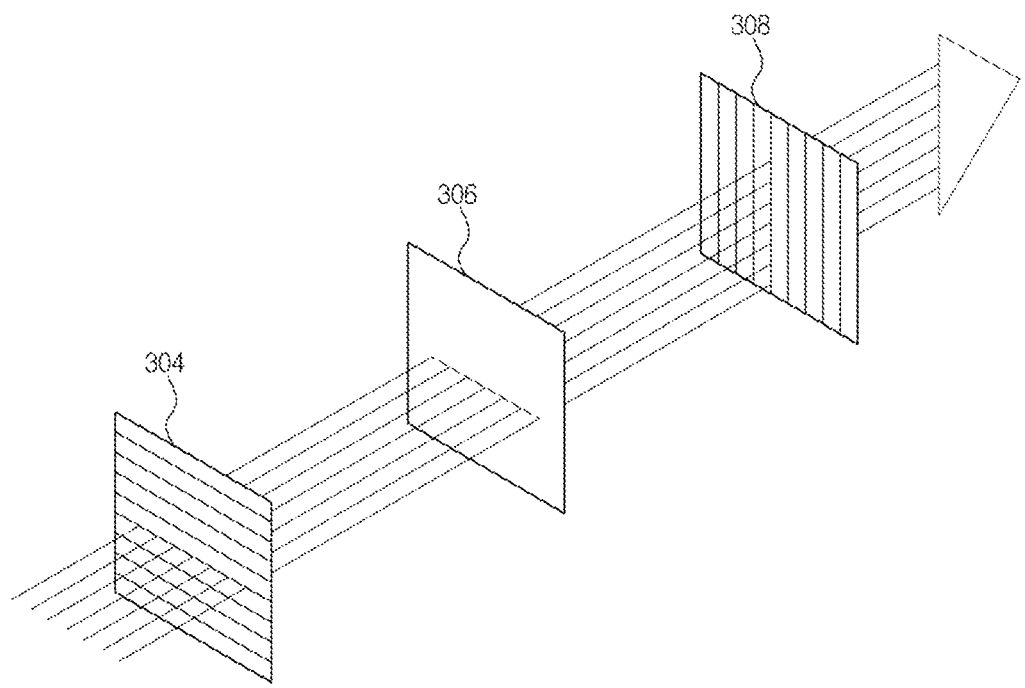

FIG. 4A is a view illustrating interception of light to be input to the left eye shutter of the liquid crystal shutter glasses, and FIG. 4B is a view illustrating interception of light to be input to the right eye shutter of the liquid crystal shutter glasses.

The liquid crystal shutter glasses 300 includes the liquid crystal members 305 and 306, and the polarizing plates 303 and 307 or 304 and 308 attached to front and rear surfaces of each of the liquid crystal members 305 and 306 to have polarizing axes orthogonal to each other. The left and right liquid crystal members 305 and 306 are alternately driven according to synchronization signals of left and right eye images and in turn, the left and right eye shutters are alternately opened or closed according to the driving of the left and right liquid crystal members 305 and 306. In this way, the liquid crystal shutter glasses 300 allow the left eye to perceive the left eye image alone and the right eye to perceive the right eye image alone.

FIG. 4A is a view schematically illustrating the progress of light through the liquid crystal shutter of the liquid crystal shutter glasses 300. If the polarizing plate 303 attached to the front surface of the liquid crystal member 305 passes a received image in a given direction during driving of the liquid crystal member 305, the liquid crystal member 305 passes the image in a direction parallel to a liquid crystal molecular direction thereof, and the polarizing plate 307 attached to the rear surface of the liquid crystal member 305 intercepts the image, preventing the viewer's eye to perceive the polarized image and keeping the liquid crystal shutter closed.

FIG. 4B is a view schematically illustrating the progress of light through the liquid crystal shutter of the liquid crystal shutter glasses 300. If the polarizing plate 304 attached to the front surface of the liquid crystal member 306 passes a received image in a given direction while the liquid crystal member 306 is not driven, the liquid crystal member 306 twists the image by 90 degrees, and the polarizing plate 308 attached to the rear surface of the liquid crystal member 306 transmits the twisted image, allowing the viewer's eye to perceive the image and keeping the liquid crystal shutter open.

With the above described operation, the liquid crystal shutters of the liquid crystal shutter glasses 300, which are composed of the liquid crystal members 305 and 306 and the polarizing plates 303 and 307 and 304 and 308 attached to the front and rear surfaces of the liquid crystal members 305 and 306, may alternately intercept or transmit left and right eye images in response to synchronization signals of the left and right eye images according to whether or not the liquid crystal members 305 and 306 are driven, realizing a stereoscopic image by means of the left and right eye images.

As is apparent from the above description, a stereoscopic imaging system according to exemplary embodiments may prevent deterioration in brightness and optical characteristics due to deviation of an optical axis upon formation of a stereoscopic image.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A stereoscopic imaging system of a glasses type, comprising:
   a stereoscopic image display device which outputs linearly polarized light;
   a first phase difference plate which is provided at a front surface of the stereoscopic image display device and which converts the linearly polarized light output from the stereoscopic image display device into circularly polarized light; and
   glasses which have a second phase difference plate attached to a front surface thereof and which restores the circularly polarized light which passes through the first phase difference plate, into the linearly polarized light,
   wherein a phase delay axis of the first phase difference plate provided at the stereoscopic image display device is orthogonal to phase delay axes of the second phase difference plate of the glasses, and
   wherein the glasses include polarizing plates located at a rear surface of the glasses, and a polarizing axis of a left polarizing plate of the polarizing plates is orthogonal to a polarizing axis of a right polarizing plate of the polarizing plates.

2. The system according to claim 1, wherein:
   the stereoscopic image display device contains a polarizing plate which outputs the linearly polarized light; and
   a polarizing axis of the polarizing plate contained in the stereoscopic image display device has an angle of 45 degrees with respect to a phase delay axis of the first phase difference plate located at the front surface of the stereoscopic image display device.

3. The system according to claim 1, wherein the first phase difference plate located at the front surface of the stereoscopic image display device and the second phase difference plate attached to the front surface of the glasses have a quarter phase delay.

4. The system according to claim 1, wherein:
   the glasses include at least one liquid crystal member which performs orthogonal or parallel light transmission on the light output from the stereoscopic image display according to a synchronization signal, and polarizing plates attached respectively to front and rear surfaces of the liquid crystal member; and
   polarizing axes of the polarizing plates attached to the front and rear surfaces are orthogonal to each other.

5. A stereoscopic imaging system of a glasses type, comprising:
   a stereoscopic image display device which outputs light;
   a polarizing plate which is provided at a front surface of the stereoscopic image display device and which converts the outputted light into linearly polarized light;
   a first phase difference plate which is provided at a front surface of the polarizing plate and which converts the linearly polarized light into circularly polarized light; and
   glasses which have a second phase difference plate attached to a front surface thereof and which restores the circularly polarized light which passes through the first phase difference plate into the linearly polarized light,
   wherein a phase delay axis of the first phase difference plate provided at the stereoscopic image display device is orthogonal to phase delay axes of the second phase difference plate of the glasses, and
   wherein the glasses include polarizing plates located at a rear surface of the glasses, and a polarizing axis of a left polarizing plate of the polarizing plates is orthogonal to a polarizing axis of a right polarizing plate of the polarizing plates.

6. The system according to claim 5, wherein a polarizing axis of the polarizing plate provided at the front surface of the stereoscopic image display device has an angle of 45 degrees with respect to a phase delay axis of the first phase difference plate located at the front surface of the polarizing plate.

7. The system according to claim 5, wherein the first phase difference plate located at the front surface of the stereoscopic image display device and the second phase difference plate attached to the front surface of the glasses have a quarter phase delay.

8. The system according to claim 5, wherein:
   the glasses include a liquid crystal member which performs orthogonal or parallel light transmission on the light output from the stereoscopic image display according to a synchronization signal, and polarizing plates attached respectively to front and rear surfaces of the liquid crystal member; and
   polarizing axes of the polarizing plates attached to the front and rear surfaces are orthogonal to each other.

9. A stereoscopic imaging system of a glasses type, comprising:
   a stereoscopic image display device which outputs linearly polarized light to display an image;
   a first phase difference plate which is provided at a front surface of the stereoscopic image display device and which converts the linearly polarized light into circularly polarized light; and
   glasses which include a left eye which passes a left eye image and a right eye which passes a right eye image, wherein the left eye includes a second phase difference plate which restores the converted circularly polarized light output from the stereoscopic image display device into the linearly polarized light and a first polarizing plate which is installed to a light emissive surface of the second phase difference plate and which passes the restored linearly polarized light, and wherein the right eye includes a third phase difference plate which restores the converted circularly polarized light output from the stereoscopic image display device into the linearly polarized light and a second polarizing plate which is installed to a light emissive surface of the third phase difference plate and which passes the restored linearly polarized light, wherein a phase delay axis of the first phase difference plate provided at the stereoscopic image display device is orthogonal to phase delay axes of the second and third phase difference plates of the glasses, and wherein the glasses include polarizing plates located at a rear surface of the glasses, and a polarizing axis of a left polarizing plate of the polarizing plates is orthogonal to a polarizing axis of a right polarizing plate of the polarizing plates.

10. The system according to claim 9, wherein:

the stereoscopic image display device includes a monitor which displays the image and a third polarizing plate which converts light output from the monitor into linearly polarized light to output the linearly polarized light; and the linearly polarized light which passed through the third polarizing plate of the stereoscopic image display device is converted into circularly polarized light by passing through the first phase difference plate provided at the front surface of the stereoscopic image display device.

11. The system according to claim 9, wherein the stereoscopic image display device further includes a liquid crystal display panel which displays the image and outputs the linearly polarized light, and a stereoscopic image control unit which separates an image, which is received from an external source and composed in the unit of a frame or field, into the left eye image and the right eye image.

12. The system according to claim 11, wherein:

the stereoscopic image display device further includes a synchronization stereoscopic signal generator which processes a signal input from the stereoscopic image control unit and generates a synchronization stereoscopic signal; and the glasses include at least one liquid crystal member which performs orthogonal or parallel light transmission on the light output from the stereoscopic image display device according to the synchronized stereoscopic signal generated in the synchronized stereoscopic signal generator, and polarizing plates attached respectively to front and rear surfaces of the liquid crystal member and which have polarizing axes orthogonal to each other.

13. The system according to claim 9, wherein phase delay axes of the second and third phase difference plates of the left eye and the right eye are arranged on the same axis.

14. A stereoscopic imaging system comprising:

a stereoscopic image display device;

a first polarizing plate which is positioned at a front surface of the stereoscopic image display device;

a first phase difference plate which is positioned at a front surface of the polarizing plate; and liquid crystal shutter glasses which include a second phase difference plate, and which receive light from the stereoscopic image display device, wherein a phase delay axis of the first phase difference plate provided at the stereoscopic image display device is orthogonal to phase delay axes of the second phase difference plate of the glasses, and wherein the liquid crystal glasses include polarizing plates located at a rear surface of the glasses, and a polarizing axis of a left polarizing plate of the polarizing plates is orthogonal to a polarizing axis of a right polarizing plate of the polarizing plates.

15. The system according to claim 14, wherein the liquid crystal shutter glasses comprise:

a second polarizing plate which is located at a front surface of the second phase difference plate, a liquid crystal member which is located adjacent to the second polarizing plate, and third polarizing plates which are located at a front surface of the liquid crystal member.

16. The system according to claim 15, wherein:

the stereoscopic image display device outputs light, the first polarizing plate converts the outputted light into linearly polarized light, the first phase difference plate converts the linearly polarized light into circularly polarized light, and a second phase difference plate restores the circularly polarized light to linearly polarized light.

17. Glasses on which a light outputting from a stereoscopic imaging system including a first phase difference plate which converts linearly polarized light to circularly polarized light is projected, the glasses comprising:

a left eye shutter which shows a left eye image; and a right eye shutter which shows a right eye image;

wherein the left eye shutter and the right eye shutter respectively comprise:

a liquid crystal member, a first polarizing plate located on a front surface of the liquid crystal member, a second polarizing plate located on a rear surface of the liquid crystal member, a second phase difference plate configured to revert circularly polarized light which is output from the first phase different plate and input into the second phase difference plate, to the linearly polarized light and transmit the reverted linearly polarized light, wherein a phase delay axis of the second phase difference plate is orthogonal to a phase delay axis of the first phase difference plate, and wherein a polarizing axis of the second polarizing plate of the left eye shutter is orthogonal to a polarizing axis of the second polarizing plate of the right eye shutter.

18. The glasses according to claim 17, wherein the first phase difference plate and the second phase difference plate have a quarter phase delay.

19. The glasses according to claim 18, wherein the phase delay axis of the second phase difference plate of the left eye shutter and the phase delay axis of the second phase different plate for the right eye shutter are arranged on a same axis.

20. The glasses according to claim 17, wherein a polarizing axis of the first polarizing plate of the left eye shutter is parallel to a polarizing axis of the first polarizing plate of the right eye shutter.

21. Glasses on which a light outputting from a first phase difference plate that is installed on a front surface of a stereoscopic imaging apparatus, the glasses comprising:

a second phase difference plate that is provided at a front surface and is configured to revert circularly polarized light which is output from the first phase different plate and input into the second phase difference plate, to the linearly polarized light and transmit the reverted linearly polarized light, wherein the second phase difference plate has the same delay characteristics as delay characteristics of the first phase difference plate, and wherein the second phase difference plate has a phase delay axis disposed orthogonal to a phase delay axis of the first phase difference plate.

22. The glasses according to claim 21, further comprising;
a left eye shutter which shows a left eye image; and
a right eye shutter which shows a right eye image.

23. The glasses according to claim 22,
wherein the left eye shutter and the right eye shutter respectively comprise:
the second phase difference plate, a liquid crystal member, a first polarizing plate located on a front surface of the liquid crystal member, and a second polarizing plate located on a rear surface of the liquid crystal member,
wherein a polarizing axis of the second polarizing plate of the left eye shutter is orthogonal to a polarizing axis of the second polarizing plate of the right eye shutter.

24. The glasses according to claim 21, wherein the phase delay axis of the second phase difference plate of a left eye and the phase delay axis of the second phase different plate for a right eye are arranged on a same axis.

\* \* \* \* \*